United States Patent
Biegaj et al.

[11] Patent Number: 6,091,731
[45] Date of Patent: Jul. 18, 2000

[54] DUPLICATION IN ASYNCHRONOUS TRANSFER MODE (ATM) NETWORK FABRICS

[75] Inventors: Janus Biegaj, Hinsdale, Ill.; Mark Aldo Bordogna, North Andover, Mass.; Mark Henry Davis, Warrenville, Ill.; Dominic Dominijanni, Hampstead, N.H.; Kurt Arnold Hedlund, Oak Park, Ill.; Gary Lynn McElvany, Atlantic Highlands, N.J.

[73] Assignee: Lucent Technologies Inc., Murray Hill, N.J.

[21] Appl. No.: 09/050,879

[22] Filed: Mar. 30, 1998

[51] Int. Cl.$^7$ .................................................. H04L 12/28
[52] U.S. Cl. ............................... 370/395; 370/218; 714/6
[58] Field of Search .................................... 370/395, 219, 370/220, 244, 412, 429, 503, 218; 714/6, 12, 13, 798, 799

[56] References Cited

U.S. PATENT DOCUMENTS

| | | | |
|---|---|---|---|
| 4,503,534 | 3/1985 | Budde et al. | 714/13 |
| 5,278,969 | 1/1994 | Pashan et al. | 714/6 |
| 5,408,463 | 4/1995 | Merchant | 370/218 |
| 5,796,717 | 8/1998 | Shinbashi et al. | 370/216 |

*Primary Examiner*—Douglas W. Olms
*Assistant Examiner*—Ken Vanderpuye
*Attorney, Agent, or Firm*—Werner Ulrich

[57] ABSTRACT

Arrangements for controlling a data switching network fabric and for synchronizing duplicate modules of such a fabric. A control complex, for determining new virtual connections to be established, and for disconnecting existing virtual connections, is connected through data links to the network fabric of a data switch. The network fabric has internal control processors. The control complex communicates with these processors by sending control packets over a dedicated internal ATM link and virtual connections to these internal processors to control their establishment and disconnection of user virtual connections. Duplicate modules of the data switching fabric receive identical packets and, when synchronized, transmit identical packets at the same time. The synchronization process is implemented by data links between the control processors of the duplicate fabrics to report progress on the step by step synchronization of internal queues. The algorithms for routing cells are identical in the two modules so that once the modules are synchronized, they remain in synchronism because they use identical paths. Advantageously, a switch to a standby module can be made without losing any cells. Advantageously, the control complex can transmit control packets at a rate limited only by the ability of the control complex to generate the packet, the ability of the fabric control processors to receive these control packets, and the bandwidth of the data links connecting the control complex to the network fabric. Advantageously, no special buses are required for connecting the control complex to the network fabric.

1 Claim, 3 Drawing Sheets

DUPLICATION IN ASYNCHRONOUS TRANSFER MODE (ATM) NETWORK FABRICS

TECHNICAL FIELD

This invention relates to methods and apparatus for controlling asynchronous transfer mode (ATM) switching networks.

Problem

The use of asynchronous transfer mode (ATM) telecommunications and switching networks has become increasingly popular as a result of advances in digital technology. ATM uses standard size packets (cells) to carry communications signals. Each cell that is transmitted over a transmission facility includes a 5 byte header and a 48 byte payload. Since the payload is in digital form, it can represent digitized voice, digitized video, digitized facsimile, digitized data, multi-media, or any combinations of the above. The header contains information which allows each switching node along the path of an ATM communication to switch the cell to the appropriate output. The cells travel from source to destination over pre-established virtual connections. In a virtual connection, all cells from the same ingress port having the same virtual connection address will be sent to the same egress port. Once a virtual connection has been established from a Customer Premises Equipment (CPE) source to a CPE destination, all cells of the virtual connection will be sent via the same nodes to the same destination.

ATM has become increasingly popular because it can take full advantage of the high bit rate that is possible over modern transmission facilities such as fiber optic systems and can use Custom Very Large Scale Integration (VLSI) circuits, high speed microprocessor technology and programmable logic arrays to switch large numbers of cells per unit time.

The amount of traffic processed by a single node is so high that it is necessary to have a node that is made up of very high reliability modules, since failures affect so many cells. This requires that modules be duplicated. However, if the duplicated modules are not fully synchronized then some form of sequence numbers must be supported on the ingress side before a signal is bridged to the fabric of both sides, along with some form of inverse multiplexing of the egress side after the duplex fabrics. The inverse multiplexing rebuilds the complete desired output cell stream based upon the sequence numbers. Depending upon the degree of non-synchronous fabric operation, an increasingly large buffer is needed by the merging function.

Solution

Applicants have recognized that synchronous fabric operation would reduce this buffer to zero. Additionally, synchronous operation would allow measurement/billing counters to be placed anywhere; non-synchronous operation restricts all counts to the ingress and egress edges. Applicants have further recognized that full synchronization is very difficult to achieve because of the number of calls stored within each module and the number of possible paths, each with a different delay, that any cell may encounter to reach a specified output port.

Applicants have, therefore recognized that a problem of the prior art is that no fully satisfactory and economical arrangement is available to provide duplication with synchronism when connections are set up or torn down in response to signals from external control paths.

The above problem is solved and an advance is made over the prior art in accordance with this invention wherein cells are injected into both of the duplicated switching modules simultaneously, and the memory contents of the two duplicated modules are maintained in synchronism. If a module is taken out of service, when that module is restored to service its routing information is first updated from information stored in a control complex for controlling the module; new path connect and path disconnect control information is also sent to that module during a refresh time segment of the updating period. In-band connection control cells for existing and new connections are transmitted to the module being restored to service in parallel with the working module. The cells associated with a specific connection pass through a fixed set of queues as they pass from the ingress to egress ports. If all queues along the way have become empty on both the active and restoring fabric, then the fabrics for this connection are identical. Since the restoring fabric starts in an empty state, it will always have fewer cells accumulated than the active fabric. If the active fabric becomes empty, then the restoring fabric would also be empty at the same time; the two fabrics are then synchronized. When multiple queues exist for a path through the fabric, the queues are emptied from the ingress to the egress side, one queue at a time. When all queues have been emptied, the two modules will be in synchronism. Advantageously, this arrangement allows a subsequent switch from a working module to a stand-by module to take place without the loss of any cell since these two modules are in perfect synchronism.

In accordance with one feature of Applicants' invention, the path control information is stored in such a way that in response to a particular set up request, the identical path is selected in the duplicate fabrics. This is accomplished by sending control cells, from a control complex, of the switch, in parallel to the duplicate fabrics; the control cells control the contents of the control memories of the two fabrics. Advantageously, this permits the contents of memory of the two modules to be maintained in synchronism.

DETAILED DESCRIPTION

Figure 1:
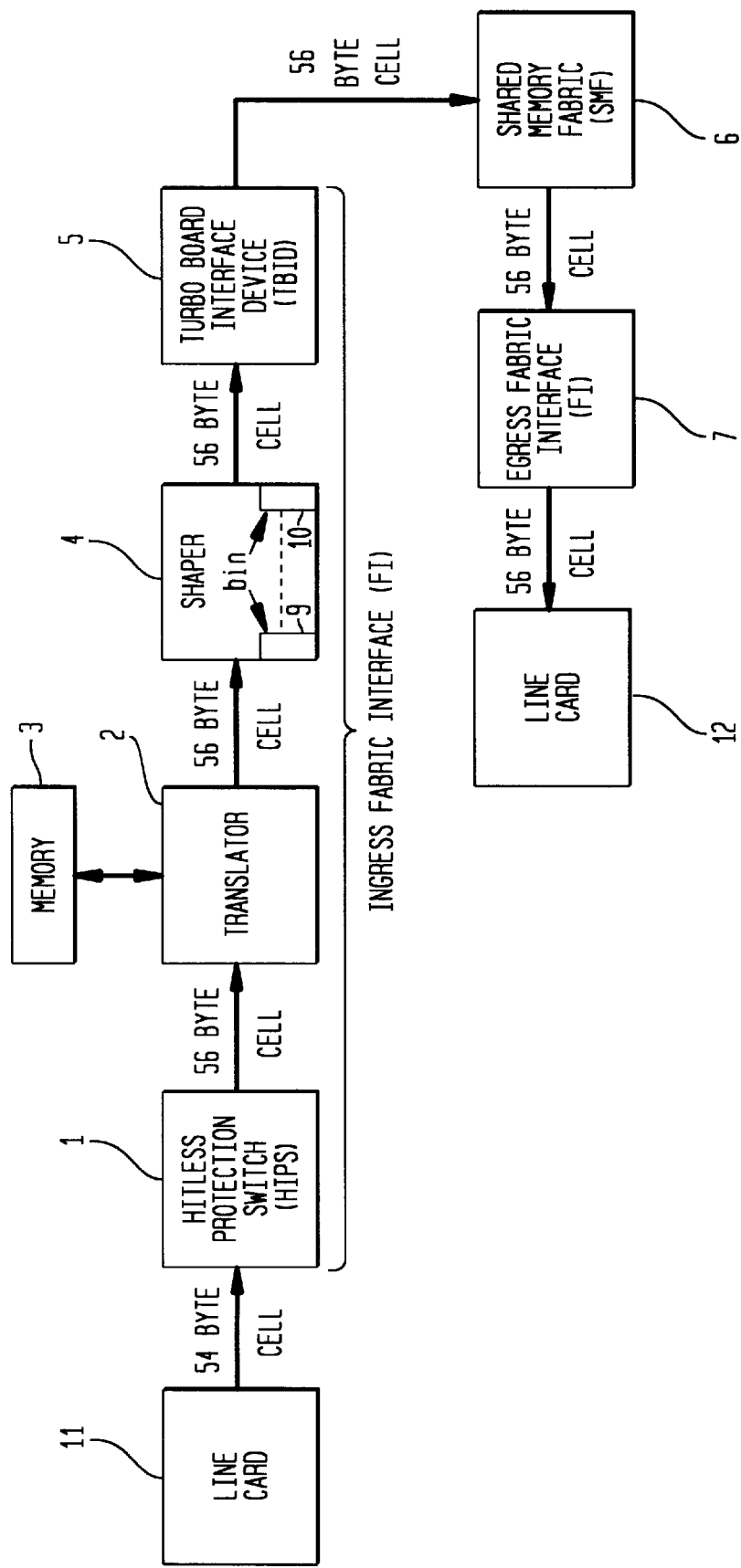
FIG. 1 is a block diagram illustrating the progress of a cell through an ingress fabric interface, a shared memory fabric and egress fabric interface of an ATM switch.

Broadly speaking, an ATM switching fabric has as its inputs a plurality of streams of ATM cells each with an identifying header specifying a virtual path identifier and in some cases a virtual channel identifier. The switching fabric takes these cells and routes them with its own internal cell identifier to an appropriate ATM output stream, where the out-going virtual path identifier (VPI) is attached. The outgoing virtual channel identifier (VCI) is also attached if the virtual connection type is a virtual channel connection. In carrying out its work, the ATM fabric stores ATM cells in order to permit ATM cells from a plurality of different ATM streams to converge onto a common output stream where they must be transmitted sequentially.

In order to perform their basic switching functions effectively, ATM switches perform the following support functions:

they tag cells and police the rate based upon leaky bucket parameters (peak and sustained cell arrival rates);

they shape the cell stream using the leaky bucket parameters of individual sources and the total queue length for cells from all sources to delay individual cells appropriately; and they schedule establishment of connections based on different service classes and within each class. The virtual path identifier at the input of the ATM switch need not be the same as the virtual path identifier at the output of the switch since the ability to retain a common identifier across an entire ATM network would require the use of a very large identifier. Consequently, the identifier is translated in each switch and a translation memory is provided in each switch to translate between input virtual path identifier and output virtual path identifier, and in some cases, also between input and output virtual channel identifiers.

The problem of keeping two duplicate switching fabric modules in total synchronism is a result of the fact that so many packets must be stored in various queues of the switching fabric. If a stand-by switching module is to be brought into synchronism with a working switching module the contents of the queues must be identical when the two units are in synchronism; otherwise, the delay in transmitting an ingress cell to an egress line will be different between two switching modules having different contents in their buffers. The problem is further compounded by the requirement for a shaper to smooth out traffic to the limitations imposed by the leaky bucket parameters of a particular virtual connection. This function is accomplished in Applicants' preferred embodiment through the use of a shaper device.

The shaper operates as a set of bins that rotate to the end after they have been serviced. Shaping has two conceptual pointers: global time, and service time. Global time advances as real time advances. Service time only advances as work in a bin is successfully processed. When all cells in a specific time bin have been processed, that bin is moved to the end of all bins. New cells are queued based upon the global time pointer and the time quantum associated with a time bin. For example, if a time bin is defined as being 44.44 microseconds, then up to 256 cells may be queued before this time bin servicing would overflow into the next time bin servicing. Every 44.44 microseconds, the global time pointer would advance to the next bin. The service time would only advance when all cells in a time bin has been serviced through which the global time has advanced. Therefore, the service time can be delayed because a burst of non-shaped cells arrived during the servicing of shaped cells of a time bin.

The control of the transmission of successive cells received from a line card and transmitted to a shaper is determined by the contents of a control memory. The control memory determines which paths are active and also determines the translation between the input virtual path identifier and output virtual path identifier. In Applicants' preferred embodiment, the contents of this memory are changed in accordance with the contents of control cells generated by a control processor complex and recognized by their virtual path identifier to have a destination that is the memory of one of the devices and processor controlling the switching fabric.

Each ATM switching module has a general purpose microprocessor and a dedicated (special purpose) microprocessor. In-band connection control cells go to the dedicated microprocessor which has a very high speed access via a chip to related information that is piggy backed onto the device provisioning information in the in-band cell. Additionally, the dedicated microprocessor, does not perform work that only a single fabric side can perform, e.g., reporting a local hardware fault condition. The duplicated dedicated microprocessors get the identical work requests in the same order and at the same time so that they can respond in identical ways. The high speed special purpose dedicated microprocessors handle communications with the control complex. The general purpose microprocessor in each ATM fabric module, accessed by the control complex through the dedicated microprocessor, can access all devices. This access is much slower than required to support rates of hundreds of call setup/teardown requests per second. The dedicated and the general microprocessor communicate via a serial link on the processor module.

The general purpose microprocessor, GMP, in each ATM fabric interface module can access devices and their associated memories via a slow serial interface. The speed of this interface cannot meet the required high setup and teardown rates. Additionally, the GMP cannot directly access the dedicated microprocessor local memory except via a slow serial link. As a result of these limitations, the GMP performs only the following type of work:

1. Maintenance actions for restoral, removal and switch between duplex fabrics, i.e., one time only action unique to a single fabric unit.

2. Hardware fault reporting, which is unique to a single fabric unit.

3. High latency up-load of ATM level connection state/status information, i.e., very bursty reporting of Alarm Indication Signals, (AIS), Remote Defect Indications, Remote Defect Indications (RDI), or Continuity Check F4/F5 level Operations, Administration, and Maintenance (OAM) states.

FIG. 1 illustrates a typical path through an ATM switch. Incoming signals are received in line card 11 and transmitted in line card 12 over this unidirectional ATM path. A bi-directional ATM connection is comprised of two unidirectional connections flowing in opposite directions between line cards 11 and 12. Line card 11, which receives standard 53 byte cells, delivers 54 byte cells to Hitless Protection Switch (HIPS) device 1. The 54th byte includes a line card identifier (three bits in Applicants' preferred embodiment), to identify one of a plurality of line cards connected to a single HIPS device 1.

A HIPS device expands the 54 byte cell to a 56 byte cell, but does not fully populate the extra two bytes. In addition, the HIPS device takes inputs from its connected line cards and inserts them into a FIFO queue for delivery as 56 byte cells to the translator device 2. The translator device 2 uses the ingress port identification, the VPI, and, optionally, the VCI, to map to an internal call identification that is passed to the Shared Memory Fabric (SMF) 6. Based on the internal call identifier, the SMF looks up in its external memory the identity of the egress port and egress cell identifier which are passed on to a translator device in the egress fabric interface 7. The egress fabric interface uses this information to look up the outgoing VPI and, optionally, VCI. The port identifier is implicitly passed to the egress fabric interface via the identify of the time slot used to send the cell.

The translator device 2 receives an input from memory 3 which contains the translation information. The translator also adds three bits into the 54th byte, the three bits being used to identify the specific ingress fabric interface module handling the call.

Shaper unit 4 spreads cells of a particular virtual connection into one of the bins 9, . . . ,10 in order to smooth out peaks of cell bursts from a particular virtual connection and to prevent such peak bursts from interfering with the traffic of other sources which are transmitting within their allowed parameters.

Shaping is performed for two main reasons:
1. Shaping reduces the burstiness than can be introduced by this switch and other upstream switches. Without shaping, a virtual connection that is meeting its policing requirements at the ingress edge of a switch may be not be meeting it policing requirements when it passes into the next downstream switch.
2. Shaping attempts to hold a Transport Control Protocol/ Internet Protocol (TCP/IP) connection cell delay to a fixed amount that will cause the actual bandwidth utilized to approach the shaping rate, helping to maintain steady TCP/IP goodput (usable IP packets).

The shaper transmits its 56 byte cells to Turbo Board Interface Device (TBID) 5, which absorbs small time variations between the output of the shaper and the input to the shared memory fabric. The TBID delivers the 56 byte cells to shared memory fabric 6. Shared memory fabric 6 performs a routing translation based on the 16 bit routing number derived by translator 2, and the 3 bit identification of the ingress fabric interface, and routes the 56 byte cells to the desired egress fabric interface. The egress fabric interface performs its routing based only on the 16 bit routing number received from the shared memory fabric. This will identify one of eight line cards. Finally, the egress fabric interface delivers 54 byte cells which have been stripped of the 16 bit internal routing number to line card 12 which strips the 54th byte and transmits the cells to a destination ATM node.

Figure 2:
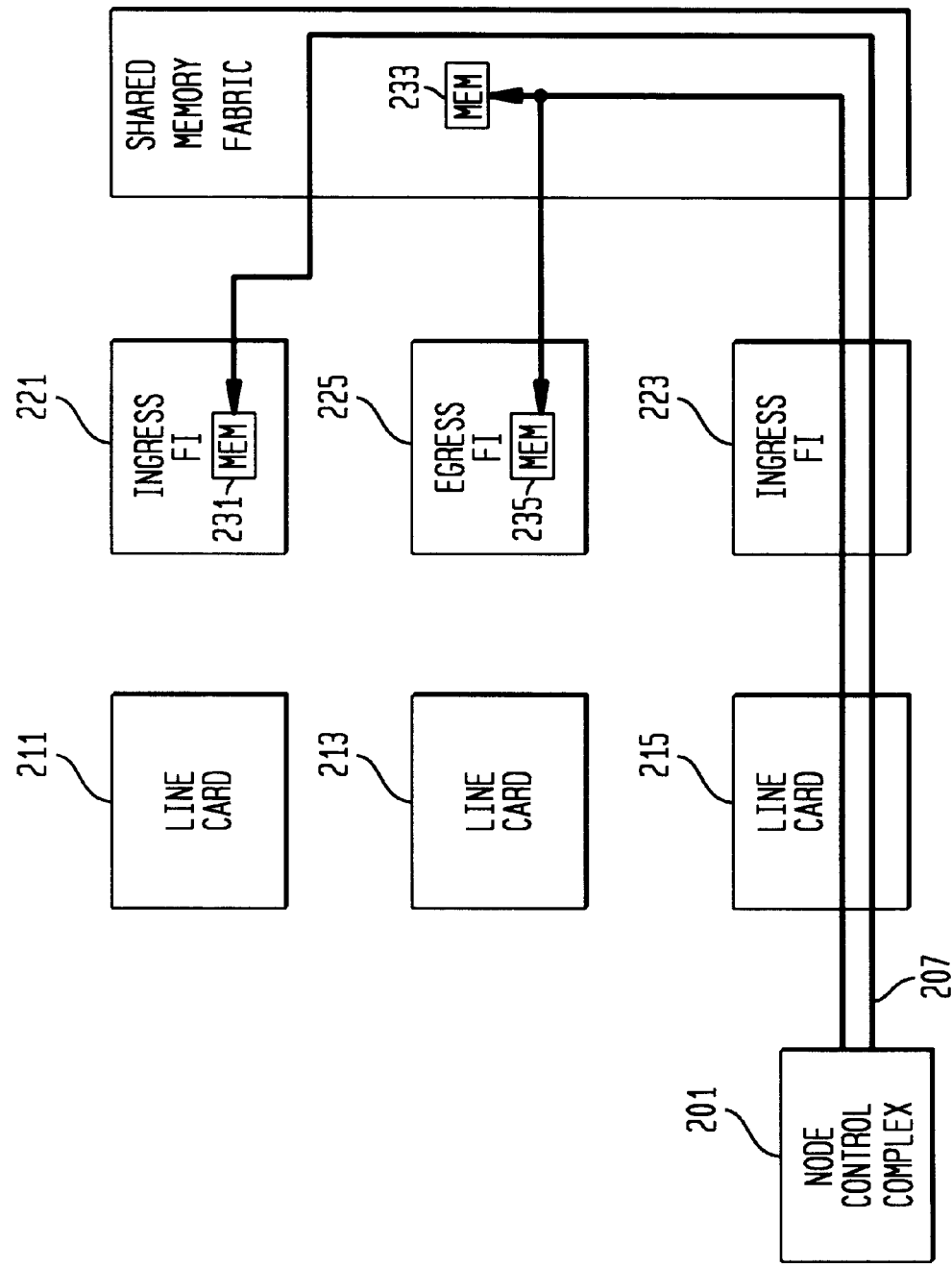
FIG. 2 is a block diagram illustrating paths for control cells from a node control complex to an ingress facilities interface, a shared memory fabric, and an egress facilities interface.

FIG. 2 illustrates the arrangement for setting up or tearing down a virtual connection. A node control complex 201 directly generates information which is to be stored in the control memories of an ingress fabric interface, an egress fabric interface and the shared memory fabric. In the example shown in FIG. 2, the virtual connection to be set up is a uni-directional virtual path 203 having its input on line card 211 and its output on line card 213. The node control complex controls the setting up and tearing down of virtual connections by writing information into the memories of the ingress fabric interface, the egress fabric interface, and the shared memory fabric. By setting thresholds correctly, it is possible to ensure that in-band connection control cells will not be dropped within the fabric. In case the node control complex wishes to establish a uni-directional virtual connection 203 from line card 211 to line card 213, it first sends a control cell over a permanent virtual connection 205 that passes through the shared memory fabric 227 and in-to the egress fabric interface 225. Devices in the shared memory fabric 227 and the translator device in fabric interface 225 and 221 will identify these set-up messages via the cell identifier, and internal cell format and content. Node control complex 201 is connected to the shared memory fabric 227 through line card 215 and ingress fabric interface 223. This control message prepares the shared memory fabric and the egress fabric interface to receive any cell of the virtual connection 203 and pass this cell on toward egress fabric interface 225. After the fabric interface 225 processes the set-up cell, this in-band connection control cell is dropped. No per connection set-up is required in the egress line card.

Next, the control complex 201 sends a control cell over permanent virtual connection 207 to memory 231 of ingress fabric interface 221. This prepares ingress fabric interface 221 to receive for virtual connection 203, and to translate the identity of the incoming virtual connection to the internal cell identifier used for internal routing within the switch. The identity of the outgoing virtual connection is received in the connected node and is used in that node as a virtual connection identifier to route the cell further.

In addition, the ingress fabric interface adds two additional bytes to each cell to allow the bytes to be routed internally within the node; i.e., to provide instructions to the shared memory fabric 227 to allow that shared memory fabric to route the cells to the proper egress fabric interface and to allow that egress fabric interface to route the cells to the appropriate connected line card. The 54th byte contains information to identify the cells, identify internally or externally generated cells, and identify the sub-port within the incoming ECR-1 stream. The egress fabric interface also substitutes an outgoing virtual connection identifier, for use by the next downstream ATM switch as its incoming virtual connection identifier.

In Applicants' preferred embodiment, the node control complex simply sends control cells which directly cause the appropriate control memories to be changed. No acknowledgement for receipt of such control cells is required since it is doubtful that any substantial number of hardware failures can be caught by such a measure. If subsequent experience indicates that it is desirable to acknowledge such control messages, this decision can, of course, be reversed.

The control cells are sent in parallel to both duplicate ingress facility interfaces, egress facilities interface and shared memory fabric so that both of the duplicate units are updated simultaneously, and so that both duplicate units will use corresponding paths.

When disconnecting a virtual connection, the first command is sent to the ingress fabric interface to insure that the disconnect is performed at the ingress fabric interface before it is performed at the egress fabric interface (FI), and shared memory fabric so that no cells are passed prematurely into the SMF or egress FI. This is done so that the SMF and egress FI buffers can be empty and available for reuse for new connections. Upon disconnect, the in-band connection control cell to tear down a virtual circuit commands the dedicated microprocessor on the fabric interface to send a response cell with the current cell counts back to the node control complex. If the cell counts in the two fabrics are the same, a control cell is immediately sent to the egress fabric interface to deprovision the virtual connection. The initial control cell to the egress fabric interface was a forced idle signal. If the counts are unequal, this deprovisioning step is deferred for a maximum of a predetermined number of seconds. (A typical delay is 10 seconds.) Forced idle causes all newly arriving cells for this connection to be replaced with idle cells, and stops the incrementing of the connection cell count. Additional cells during forced idle will not trigger any hardware misroute fault indications. Deprovisioning after forced idle has been completed, causes all cells received with this cell identifier to trigger a misrouting fault indication. This misroute indication is one of the best indications in this system that the hardware is not functioning correctly.

Bi-directional virtual connections are set up as two uni-directional connections. While each uni-directional connection set-up must be done in the right sequence, there is no requirement for coordinating the sequences of the two uni-directional connection set-ups and disconnects, except that the time between setting up the two directions must not be long lest a false trouble indication be generated by one of the end points.

In Applicants' preferred embodiment, two duplicate ATM fabrics are fully synchronized. The two duplicate fabrics receive inputs in parallel from the line cards. The contents of their control memories are synchronized because these control memories receive commands from the node control complex in parallel when the node control complex transmits control cells. Since the same cells are being received simultaneously, and there are no random operations within either fabric, the contents of the queues in the two fabrics are identical. Their outputs are matched in order to detect errors or faults in either fabric.

When a fabric is removed from service in order to perform diagnostics and/or repairs, a resynchronization process must be performed when that fabric is brought back on line.

Figure 3:
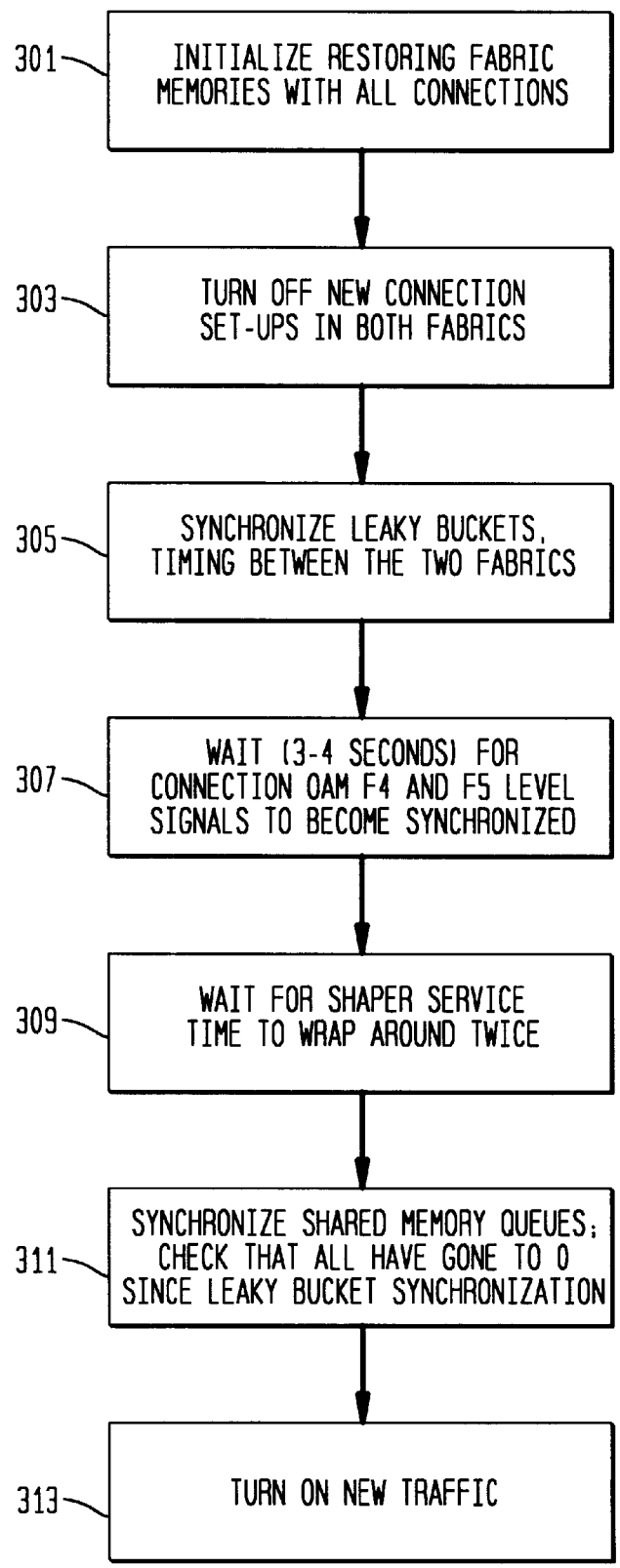
FIG. 3 is a flow diagram illustrating the process of synchronizing a working and a stand-by module during the time of initialization of the stand-by module.

The resynchronization process is illustrated in FIG. 3. Before all connections can be resynchronized, the following must be done:

1. Reset the out-of-service devices and initialize all static provisioning parameters the same.
2. The dedicated microprocessor task queue on all the active fabric interfaces must be empty. This is done by stopping the sending of all new in-band control cells until all tasks have been serviced.

The overall synchronization process can be understood as follows: components of the fabric are being synchronized from the ingress to the egress direction. One cannot synchronize a queue internal to the fabric until cells arriving at that internal queue are synchronized. Both the active and restoring sides must be processing the same cell traffic. First, the leaky buckets on the ingress edge are synchronized. Then, the shaper that used data derived from the leaky bucket is synchronized. When the shaper is synchronized, the SMF and its associated internal queues, i.e., SMF port queues, can be synchronized. Broadly, in Action Block 301, cell traffic starts to enter both sides in the same way. Action Block 303 insures that things are not changing while the leaky buckets and counts are processed. After Action Block 305, the traffic shapers are seeing identical incoming data. After Action Block 307, the ingress FIs are shipping identical externally generated cells to their associated SMFs. After Action Block 309, the ingress FIs are shipping identical internal and externally generated data to their associated SMFs. The SMF port queues are synchronized in Action Block 311.

In more detail, the standby fabric memories are first initialized with all current connections (Action Block 301). The standby connections are provisioned by sending in-band connection control set-up cells. These cells go to both the active and the restoring sides. This causes some of the policing values of the active side to be set to their initial values. During this initialization period, additional traffic can be accepted provided that the memory of the standby fabric is also updated with new connection and disconnection information.

After the standby fabric memories have been fully initialized, all new connection requests are halted for both fabrics (Action Block 303). In Applicants' preferred embodiment, disconnect requests are treated the same way as connection requests; this is important if the end-user is still sending cells at the time of the disconnect request. Connection counts are copied from the active to the restoring fabric via the serial link between the dedicated microprocessor and the general purpose microprocessor, and then an Ethernet® link between the general purpose microprocessors of the active and the restoring fabric. After all connections have been provisioned, a restore code triggers a counter bank switch. The active fabric reads its counter devices and adds their contents to its billing and measurement counts in processor memory. It then passes this information to the restoring fabric that uses it to populate its local accumulate memory. Since all connections were provisioned at the time of the bank switch, the ingress device counts of the two modules will be the same. Similar processing is performed for the egress counts as the fabrics are synchronized. The leaky bucket timing is then synchronized between the two fabrics (Action Block 305). This synchronization involves having the two fabrics point to the same bin within the shaper and providing the same timing parameters to the restoring fabric.

Then, it is necessary to wait for the virtual path/channel connection operations, administration and maintenance (OAM) F4 and F5 levels to become synchronized, i.e., to generate alarm indication signals (AIS)/remote defect indications (RDI) and continuity check (cc) cells at the same time, and to report the same connection state information, (Action Block 307). In a typical system, this would take three to four seconds.

Next, enough time is allowed to have the shaper 4 go through its cycle twice (Action Block 309). After the connection leaky buckets have been synchronized, cells would be assigned to the same shaper time bins. Waiting for two cycles through the time bins insures that all cells with different time delays have been processed by the shaper and are no longer influencing later queue cells. The maximum shaping delay is provisionable between 0.75 to about 3 seconds. Waiting a few seconds, will exceed the worst case shaper cycle time.

Next, the shared memory queues in the shared memory fabric are synchronized (Action Block 311). In order to insure that they have become synchronized, it is sufficient to insure that all of them have gone to zero to allow for a subsequent leaky bucket synchronization. The standby starts accepting calls after the time of Action Block 301.

Following the synchronization of the shared memory queues, the two fabrics are in synchronism and new traffic may be accepted by both fabrics (Action Block 313).

The above description is of one exemplary embodiment of Applicants' invention. Many other embodiments will be apparent to those of ordinary skill in the art. The invention is thus limited only by the attached claims.

What is claimed is:

1. A method of synchronizing duplicated ATM (Asynchronous Transfer Mode) network fabrics comprising an active fabric module and a restoring fabric module, comprising the steps of:

initializing a memory of the restoring fabric with connection information for all connections in the active fabric;

turning off new requests for connections in the active and the restoring fabric modules;

synchronizing leaky buckets and timing between the active and the restoring fabric;

waiting for virtual connection levels to be synchronized between the active and the restoring fabric;

synchronizing memory queues in the active and restoring fabrics, including insuring that all queues have been emptied since the leaky bucket synchronization;

turning on new requests for connections in the active and the restoring fabric; and responding identically in the active and restoring fabric to any new requests for connections.

\* \* \* \* \*